US009317194B2

(12) United States Patent
Schadewaldt et al.

(10) Patent No.: US 9,317,194 B2
(45) Date of Patent: Apr. 19, 2016

(54) STATUS-INDICATOR FOR SUB-VOLUMES OF MULTI-DIMENSIONAL IMAGES IN GUIS USED IN IMAGE PROCESSING

(75) Inventors: Nicole Schadewaldt, Norderstedt (DE); Daniel Bystrov, Hamburg (DE); Heinrich Schulz, Hamburg (DE); Torbjorn Vik, Hamburg (DE); Jochen Peters, Norderstedt (DE)

(73) Assignee: Koninklijke Philips N.V., Eindhoven (NL)

( * ) Notice: Subject to any disclaimer, the term of this patent is extended or adjusted under 35 U.S.C. 154(b) by 223 days.

(21) Appl. No.: 14/343,532

(22) PCT Filed: Sep. 14, 2012

(86) PCT No.: PCT/IB2012/054818
§ 371 (c)(1),
(2), (4) Date: Mar. 7, 2014

(87) PCT Pub. No.: WO2013/042025
PCT Pub. Date: Mar. 28, 2013

(65) Prior Publication Data
US 2014/0229881 A1    Aug. 14, 2014

Related U.S. Application Data (60) Provisional application No. 61/536,112, filed on Sep. 19, 2011.

(51) Int. Cl.
*G06F 3/048* (2013.01)
*G06F 3/0484* (2013.01)
*G06F 3/0485* (2013.01)
(Continued)

(52) U.S. Cl.
CPC .......... *G06F 3/04845* (2013.01); *G06F 3/0481* (2013.01); *G06F 3/0484* (2013.01); *G06F 3/04815* (2013.01); *G06F 3/04842* (2013.01);
(Continued)

(58) Field of Classification Search
CPC ..... G06T 19/00; G06F 3/0485; G06F 3/0481; G06F 3/04815; G06F 3/04845; G06F 3/0484
See application file for complete search history.

(56) References Cited

U.S. PATENT DOCUMENTS

2007/0116357 A1* 5/2007 DeWaele ............. G06K 9/3233
382/173
2008/0279429 A1* 11/2008 Fradkin ................ G06T 7/0083
382/128

(Continued)

FOREIGN PATENT DOCUMENTS

WO    WO2009074930    6/2009

OTHER PUBLICATIONS

V. Pekar et al., "Automated Model-Based Organ Delineation for Radiotheraphy Planning in Prostatic Region", International Journal of Radiation: Oncology Biology Physics, vol. 60, No. 3, Nov. 1, 2004, pp. 973-980.

(Continued)

*Primary Examiner* — Rashawn Tillery (57) ABSTRACT

An apparatus and user interface (155) for aiding in navigating and modifying delineations (117*a-c*) in or associated with 2D sub-volumes (110*a-c*) of a 3D or higher dimensional image dataset (100). States and position of the sub-volumes visualized. Both, states and position can be changed by using the functionalities of the user interface generated (155) by said apparatus. The apparatus can be used in medical image post-processing system.

13 Claims, 5 Drawing Sheets

(51) Int. Cl.
*G06T 19/00* (2011.01)
*G06F 3/0481* (2013.01)

(52) U.S. Cl.
CPC ........ *G06F 3/04847* (2013.01); *G06F 3/04855* (2013.01); *G06T 19/00* (2013.01); *G06T 2200/24* (2013.01); *G06T 2210/41* (2013.01)

(56) References Cited

U.S. PATENT DOCUMENTS

2011/0150312 A1* 6/2011 Takanami ............ G06T 7/0081
 382/131
2011/0225523 A1* 9/2011 Newton ............ H04N 13/0018
 715/762
2014/0298270 A1* 10/2014 Wiemker ............ A61B 6/466
 715/849

OTHER PUBLICATIONS

Anonymous author, "Scrollbar", Wikipedia.org, Nov. 21, 2009, pp. 1-3.
C. Tietjen et al., "Enhancing Slice-Based Visualizations of Medical Volume Data", Proceedings of the Eurographics/IEEE VGTC Symposium on Visualization (EUROVIS 2006), May 8-10, 2006, Lisbon, Portugal, pp. 123-130.

* cited by examiner

STATUS-INDICATOR FOR SUB-VOLUMES OF MULTI-DIMENSIONAL IMAGES IN GUIS USED IN IMAGE PROCESSING

CROSS-REFERENCE TO PRIOR APPLICATIONS

This application is the U.S. National Phase application under 35 U.S.C. §371 of International Application Serial No. PCT/IB2012/05418, filed on Sep. 14,2012, which claims the benefit of U.S. Application Ser. No. 61/536,112, filed on Sep. 9,2011. These applications are hereby incorporated by reference herein.

FIELD OF THE INVENTION

The present invention relates to an apparatus for aiding in navigating or modifying an at least 3D image data set, a method of aiding in navigating or modifying an at least 3D image data set, a graphical user interface for aiding in navigating or modifying an at least 3D image data set, a medical image post processing system for aiding in navigating or modifying an at least 3D image data set, a computer program element, and a computer readable medium.

BACKGROUND OF THE INVENTION

Many medical procedures require the delineation of certain objects shown in medical images. Examples are the organ-of-risk and target volume delineation in computed tomography (CT) images for radiotherapy planning or tumor delineation in CT, magnetic resonance (MR) or functional images for diagnosis. Medical image segmentation applications require manual delineation of the 'object to segment' for training and evaluation of automatic procedures.

Such manual delineation tasks require tools to mark the object or the surface of the object when shown on a screen. Automatic 3D delineation procedures require efficient viewing devices for quality assurance of the results and also delineation tools, if possible 3D tools, for manual correction, where necessary.

Most medical image data are three dimensional (3D) volumes or even higher dimensional, e.g. video sequences or if images acquired from several types of imaging equipment are to be considered simultaneously. Only two dimensional (2D) data can be displayed fully on screen and a 3D delineation interaction is displayed on a 2D sub-volume ("slice") of the 3D volume. The restricted 2D view on 3D image data makes handling of the 3D delineation tool at times cumbersome.

SUMMARY OF THE INVENTION

It is an object of the present invention to ease the burden on medical personnel when using 3D delineations tools to delineate slices.

The object of the present invention is solved by the subject-matter of the independent claims, wherein further embodiments are incorporated in the dependent claims.

It should be noted that the following described aspects of the invention apply also to the graphical user interface generated by below apparatus, the method of aiding in navigating or modifying the at least 3D image data, the medical image post processing system for aiding in navigating or modifying an at least 3D image data set as well as to the computer program element and the computer readable medium.

According to a first aspect of the present invention there is provided an apparatus for aiding in navigating or modifying a 3D (or higher dimensional) image data set. The set includes a plurality of cross sectional 2D image slices, including first and second slices. The slices represent a cross sectional view on the 3D image date set. Each one of the two slices has or is in one of a plurality of states. The apparatus comprises:

a) a database interface to access the 3D image data set and the slices therein;
b) a graphical user interface controller configured to display on a screen a graphical user interface (GUI). The graphical user interface, when so controlled and displayed on the screen, comprises:
b.1) a selection widget to select for display as an image a first slice of the 3D image data;
b.2) a window widget for displaying the first slice as an image;
b.3) a graphical slice position indicator widget for i) displaying a visual indication of the spatial position of the first slice in the 3D image data set, and ii) for displaying a visual indication of the spatial position of the second slice in the 3D image data set and for indicating the relative positions of first and second slice in the 3D image data set;
b.4) a graphical element for displaying a visual indication of a current status of the first slice and of a current status of the second slice. Different states are represented by different visual indications.

The graphical user interface controller is further configured to i) receive a user request to change the current status of the first or the second slice into a new status from among the plurality of states and when the user request to change the current status has been received, to
ii) update the displaying of the visual indication of the status of the first or second slice to now represent the requested new status of the first or second slice.

According to one embodiment of the present invention the GUI when displayed includes a selection widget to select for display as an image the first slice of the 3D image data.

The regions of interest may be a particular organ of a patient that is shown in the digital 3D image data set. The 3D image data set (the "volume") is made up of or allows generating the 2D sub-volume images also called slices.

3D delineations are data structures that allow identifying and displaying geometrical portions or regions of image pixels on a slice. The 3D delineation is per slice ("2D sub-volume delineation") and associated with one and only one slice, the delineation identifying a particular cross section of a region of interest in that slice. However the (3D) delineated region of interest itself extends across a number of other slices. The 3D delineation of the region of interest is therefore a collection of associated, logically linked slice delineations. The 3D delineation when shown overlaid on the slice with which it is associated may also be referred to as "the 3D delineation", in particular when the delineation is said to be "displayed" or "overlaid". The 3D delineations may be assigned previously before being viewed by the apparatus or the delineation may be applied automatically upon loading the 3D image set for viewing. Not exclusively but in particular in case of an automatic 3D delineation procedure there are likely to be plurality of delineations in any slice. Image data includes the slices and the data structures that store information necessary to show the delineation when viewed overlaid on the slice associated with the delineation. Image modification as understood herein includes modifying the delineation information itself Modifying delineation information thus affects the graphical representation of the combined image of slice and delineation when viewed with the slice having the modified delineation overlaid.

States describe a property of the slice as a whole or, in particular, a property of the 2D sub-volume-delineation in or associated with a slice. The states may be assigned manually or automatically or upon invoking the apparatus or upon loading slices of the 3D image set for viewing. The states may be assigned manually by any suitable data structures to the slices previously to their viewing in an initializing phase one by one. The states may also be assigned to the slices and/or the delineations associated with the slices by assigned the same default state for each slice.

According to one embodiment of the invention assigning states or default states is user initiated and is effected by using a computer mouse and by mouse click on the slide bar or a check box displayed in or around the window widget.

Using a 2D delineator that is applied slice by slice and acts only on the particular slice being delineated is slow and tedious. The higher dimensional 3D delineators such as a 3D paintbrush allow faster delineation, but will also affect slices, which are not currently visible to the user at the time the 3D delineator is applied.

The GUI of the apparatus has graphical elements that serve as slice-status-indicator to communicate the state even of the hidden slices or parts of the 3D volume. The apparatus allows visualizing which of the non-displayed 2D sub-volumes are (or are not) affected by the application of the 3D delineator tool.

According to one embodiment of the present invention, each of the two slices includes
a sub-volume delineation. Each sub-volume delineation represents by outlining or by color fill a different cross section of a 3D (or higher dimensional) delineation (or outline or surface) of a region of interest in the 3D image data set. The 3D delineation extends across at least the two slices. The 3D delineations might be a result of an application to the first slice of a 3D delineation tool. The action of the 3D delineation tool logically links the delineations of or in the slices so that a later modification by the same or another 3D delineation tool of the delineation in the first slice would automatically effect a corresponding co-modification of the delineation in the second slice. Each of the slices has or is in one of two states, either a protected or an unprotected state. When the second slice is in the unprotected state and the first slice being modified by applying the delineator, the co-modification of the second slice is allowed whereas when the second slice is in the protected state, the co-modification is blocked.

The apparatus allows medical personnel to better gauge and control impact of a 3D delineator on a collection of slices in a 3D image volume.

The concept of having protected/unprotected states includes the case of categories or "super-states". Each super-state may itself be switchable between protected and unprotected "supra-states". For instance, three "super-states" may each in turn indicate noise levels low, medium and high in the slices. Each of the noise level super states may then still be switchable between protected and unprotected with the slide bar elements indicating in any one of the three colors the super state of the currently viewed slice. The protected/unprotected supra-states are then indicated by color-coding components of the window widget.

According to one embodiment of the present invention the graphical slice position indicator is a slide bar GUI widget. The slide bar comprises graphical slider icon and a graphical bar icon. The slider is capable of sliding along the bar upon user interaction by a pointer device (such as a mouse or screen pen). The bar comprising a series of segments as the graphical elements. Each segment is associated with one of the slices including first and second slices and different segments indicate different slices. Contiguous segments indicate contiguous spatial relationship in the 3D data set of the respective slices. The true spatial relationship (for example front, middle, end) of the region of interest in the 3D data set is thus mapped into and represented by the mutual graphical/spatial arrangement of the elements on the bar.

Having a slide bar allows quick and intuitive operation of the apparatus and to convey to the reader both the state and the spatial position in the 3D image set.

According to one embodiment the interactive bar segments of the bar allow the user by mouse click thereon to change the view in the window and to view another slice associated with the clicked on segment. In other embodiments the GUI includes a scroll function to scroll through the slices one at a time.

According to one embodiment of the present invention the displaying of the visual indication of the states of any slice including the first and second slice is by color-coding the bar segments. Each color indicates a different state and the slider changes its color when being slid or dragged by use mouse interaction over the bar. The slider when positioned over any one of the segments is echoing or assuming the color of that segment.

According to one embodiment of the present invention the graphical element is a frame of the window widget. The visual indication of the status of the first or second slice is by color-coding the frame, one color at time for the slice currently displayed in the window widget. According to another embodiment, the graphical element is a color-coded disk icon overlaid on and positioned inside the window widget. The different color coding schemes explained above allow yet a better communication of the states during the delineation review.

According to one embodiment, it is the displayed delineation itself overlaid on the slice that color-codes the state.

According to one embodiment the bar's slider comprises a horizontal slice-positioning line. The color of the horizontal slice-positioning line color-codes the state of the currently displayed slice.

According to one embodiment the status is indicated for the current slice and all or a user configurable selection of the currently non-visible slices in the 3D image data set.

According to one embodiment, the protected ("fixed") state is shown in green whereas the unprotected ("unfixed") is shown in the current screen background color or the state is indicted by different shading compared to the background color.

Color coding of regions (stacks of slices) can also be used to indicate manual or even automatic assessments of the slices or its delineations. For example the state may indicate a quality of delineations when senior personnel reviews delineation work of trainee staff. States may then indicate green=excellent segmentation, yellow=imperfect, red=serious. The states and their color coding may also or alternatively indicate the image signal noise levels (low, medium, high) in the acquired slices.

According to one embodiment of the present invention the status change or the changeover from displaying the first instead of the second slice is effected by the controller intercepting a mouse click event or a keystroke event. Consecutive events cause toggling between two of the states if there are exactly two states for each slice or the consecutive events cause periodic cycling through the states if there are more than two states for each slice. This affords a quick and simple interaction to change the status. The components of the GUI change their color when a change of the status is requested. One example for a keystroke interaction is to configure the apparatus to assign the 'f'-key to fix or unfix a slice.

This is intuitive to use with repeated hits on the 'f'-key alternately activating/deactivating the current-slice status-indicator. If there are multiple slice-states, one can use the simple keyboard interaction to toggle through the possible states.

By having the apparatus configured to color-code of components of the GUI to visualize the status (fix/unfixed) of a delineation allows efficient use of the 3D delineation tool.

In sum, the visualizations afforded by the apparatus according to the present invention enable the user to quickly access, how much and which parts of the total volume are in which state and what the status of neighboring slices to the currently displayed slice is. It provides a fast and intuitive way to grasp the effect or non-effect of a multidimensional tool on hidden slices of the 3D image volume. The apparatus aids the user avoiding inadvertent changes or modifying slices, which are already delineated to his or her satisfaction. The apparatus allows protecting a slice from such a modification. A further application of 3D tools to the same or even another slice would then not change the fixed delineation of that protected delineation in that slice.

The invention may be put to use in radio therapy planning workstations, medical image post-processing workstations for interactive medical image segmentation.

These and other aspects of the invention will become apparent from and elucidated with reference to the embodiments described hereinafter.

BRIEF DESCRIPTION OF THE DRAWINGS

Example embodiments of the invention will be described in the following with reference to the following drawings.

DETAILED DESCRIPTION OF EMBODIMENTS

Figure 1:
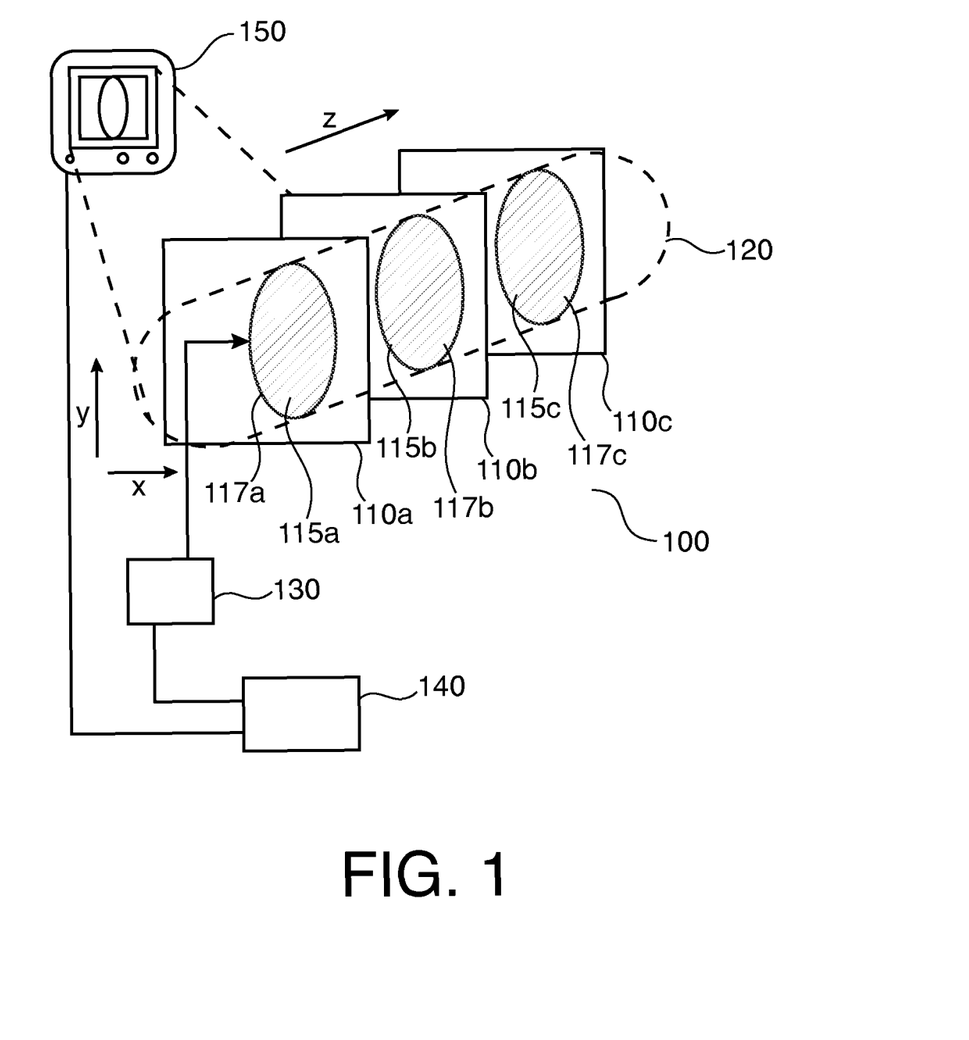
FIG. 1 schematically shows a 3D medical image data set and the action of a 3D delineation tool on the set.

With reference to FIG. 1, a volume of medical 3D image data 100 includes a number of sub-volume slices 110a-c. The 3D image data set has been acquired by medical imaging equipment during an examination scan of a patient. Examples for the medical imaging equipment include computed tomography CT scanners. The collection of slices 110a-c affords a cross sectional view on a region of interest 120 inside the body of the patient, for example the liver or the kidneys.

The individual cross sections 115a-c of the region of interest 120 in each one of the slices 110a-c is shown as a hashured oval in FIG. 1. The region of interest 120 can be said to extend across the slices 110a-c with each slice 110a-c showing a particular cross section 115a-c. The image data set 100 is three dimensional because each slice 110a-c can be described by coordinates along two axes x, y. Each of the individual slices 110a-c was acquired "in depth" as the CT equipment gradually moved along an axis z aligned with a longitudinal axis of the patient. The respective acquisition position of each of the slices 110a-c can be indicated by a third coordinate along the z axis. The 3D data image set 100 including its slices 110a-c is available for post processing or viewing as digital image data in a suitable file format such as DICOM or JPEG. The image data set 100 is held in a suitable data base.

FIG. 1 further shows a processing unit 140 in communication with a computer screen 150 on which the slices 110a-c can be viewed by a medical practitioner such as a radiologist.

A task in medical image post processing is to outline or delineate the cross sections 115a-c of the region of interest 120 in each or a selection of the slices 110a-c. To this end, a 3D delineation tool 130 may be used. The 3D delineation tool 130 is in communication with a pointing device such as a computer mouse. The radiologist then circumscribes or outlines the perimeter of cross section 115a to obtain the delineation 117a of the cross section 115a. The 3D delineation tool then uses pixel or voxel values inside and outside the region defined by delineation 117a to extrapolate corresponding delineations 117b-c of cross-sections 115b-c of the region of interest 120 in the remaining but not currently viewed slices 110b and 110c. The 3D delineation tool uses image or pattern recognition software to identify the delineations 117b and 117c in the respective slices 110b and 110c. The extrapolated delineations 117b-117c and the respective cross-sections 115b-c outlined by delineations 117b-117c best match in pixel/voxel values and shape the first or initial delineation 117a.

The 3D delineation tool 130 allows the radiologist to "3D grab" the region of interest 120 across all the slices 110a-c although he performs the delineation action only on the initial 2D slice 110a which he is currently viewing.

The delineations 117a-c themselves are metadata encoding the co-ordinate position and geometrical shape for delineation 117a-c in its respective slice 110a-c. The delineations 117a-c can be stored alongside or in association with the 3D image data 100 for later retrieval. When viewed again on the screen 150, the delineations 117a-c are then again shown graphically over-laid on its corresponding slice 110a-c, depending on which slice is then being viewed.

Normally not all of the automatically generated delineations 117a-c may be judged satisfactory by the radiologist. The radiologist will then have to review each or some of the slices 110a-c to edit or modify delineations 117a-c. For example, delineation 117b as extrapolated from initial slice 117a may be found to have the wrong shape so it does not properly cover the cross section of the region of interest as shown in slice 110b. He may then use again the 3D delineation tool 130 to readjust or edit the delineation 117b.

Figure 2:
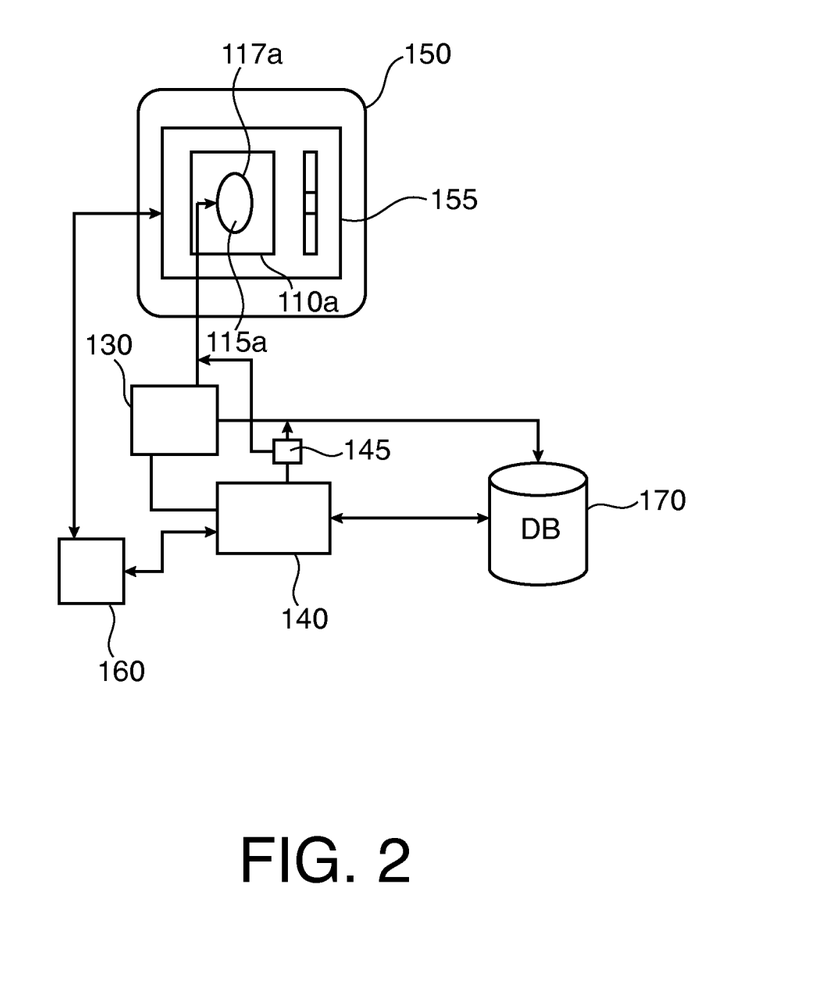
FIG. 2 schematically shows a medical image post processing system for aiding in navigating or modifying a 3D image data set according to one embodiment of the invention.

FIG. 2 shows according to one embodiment of the invention a medical image post processing system for aiding the radiologist navigating and/or modifying the 3D image data set 100. The system comprises a data base 170 holding the 3D image data set 100 including the slices 110a-c. A processing unit 140 runs a graphical user interface (GUI) 155 controller 160 controlling the visual appearance and functionalities of a graphical interface 155 as displayed on the screen 150.

Figure 3A:
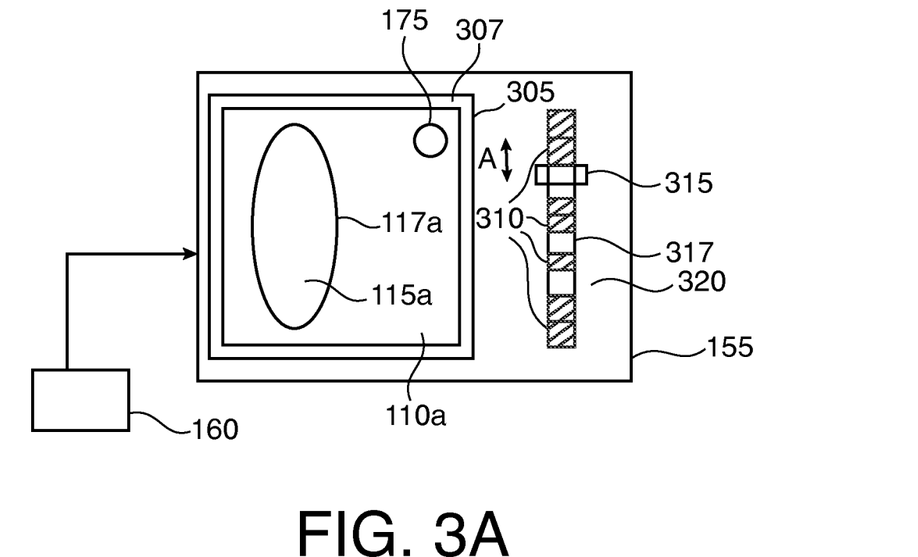
FIG. 3A to 3B show different views of an apparatus for aiding navigation or modification of a 3D image data set.
Figure 3B:
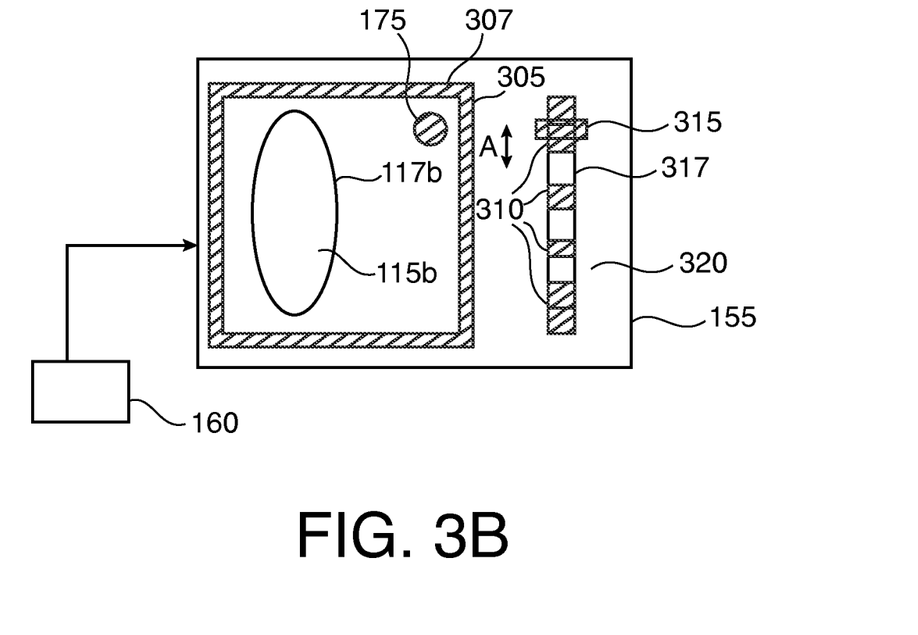

The graphical user interface 155 is shown in more detail in FIGS. 3A and 3B. The graphical user interface 155 comprises a window widget 305 having a frame 307 and a graphical slide bar 320 arranged adjacent to the window widget 305. The graphical slide bar 320 may in other embodiments be arranged not vertically but horizontally over or under the window widget 305. The slide bar 320 comprises a slider 315 and bar 317. Bar 317 is made up of segments 310, arranged side by side in a contiguous relationship. Graphical user interface 155 by way of its interactive widget and icon components allows user interaction by mouse click or other pointer tools. In other embodiments the controller is configured to additionally respond to keystrokes on a keyboard connected to the processing unit 140.

The graphical user interface 155 and its elements, the slide bar 320 and the window widget 305, are available as GUI widget tool kits and can be programmed using an object orientated programming environment such as C++.

Operation

Upon start-up of the graphical user interface controller 160, the GUI 155 is displayed with vacant window widget 305. GUI 155 includes a load button widget (not shown) to allow user to initiate loading a slice 110a-c of the 3D image data set 100. Controller 160 then selects a default or user selectable slice 110a and presents it for view on screen 150 in the window widget 305.

In FIG. 3A, slice 110a shows cross section 115a of the region of interest 120 and the delineation 117a. The 3D delineation may be the result of a previous application of the delineation tool 130. In other embodiments, the delineation 117a along with delineations 117b-c (not shown because hidden in the current view on slide 110a) may instead be generated automatically upon loading the slice 110a, b or c.

When user has selected the 3D image set 100, controller 160 invokes a routine to assign one of two states to each of the individually stored delineations 117a-c. In an initial phase all delineations 117a-c have states assigned although only one of the slices, in this case 117a, is shown on screen in the window 305 upon invoking the graphical user interface 155. In other embodiments no default states are assigned because states have already been assigned when loading slices 110a-c.

According to one embodiment the user may choose which of the delineations should have states assigned to. This may save CPU time if certain delineations are a priori not of interest to the radiologist. The assignment of states to delineations 117a-c can be implemented by a suitable data structure such as an associative ray. Each delineation 117a-c is then associated with a flag. If the flag is set for a particular delineation, say 117a, the delineation 117a is in one state and if the flag is not set the delineation 117a is in the other state. Furthermore, each delineation 117a-c is associated by a pointer or reference structure to one and only one of the slices 110a-c. The explanation with respect to first slice 117a is exemplary only and similar explanations apply to all other delineations 117b-c and their slices 110b-c.

According to one embodiment of the invention the two states are a protected state and an unprotected state. When in the unprotected state the respective delineation 117a-c can be modified by the 3D delineation tool. When in the protected state the respective delineation 170a-c cannot be modified by the 3D delineation tool. In the initial phase, each of the delineations 117a-c are assigned default states, for example either all are unprotected or protected. The user can navigate through the slices 110a-c by using a slide bar 320. The slider bar 320 has a computer mouse responsive interactive slider 315 that can be dragged up and down bar 317 of slide bar 320. The bar 317 comprises segment 310 each segment 310 corresponding to exactly one of the slices 110a-c. The arrangement of segments 310 across the bar 317 corresponds to the mutual spatial relationship of the slices 110 across the 3D image data set 100. In other words two contiguous elements 310 will indicate to the user that the respective slices 110a and b are neighboring slices in the 3D image set 100.

By dragging slider 350 the user can therefore scroll one slice at a time through the 3D image data set 100. When the slider 315 is positioned over a particular segment 310 window 305 will then change the view and show instead the slice 110b or 110c associated with that particular segment 310. Whether or not a delineation 117a-c shown on its slice 110a-c is protected or not is color-coded by the coloring of the segment 310 associated with the respective slice 110a-c. Color-coding is shown in FIG. 3a schematically as hashured ("protected") or unhachured ("unprotected") segments 310.

When in unprotected state the controller 160 is configured to make element 310 assume the background color of the GUI 155 canvas. In order to allow better view, according to one aspect of the invention, slider 315 is programmed to echo or assume the color of the segment 310 the slider 315 is currently positioned at. The slider 315 can thus be said to be configured to exhibit "transparent" behavior.

The user can modify the currently shown delineation 117a of slice 110a only if delineation 117a is in the unprotected state. After having modified delineation 117a by the 3D delineation 130, the user can then protect or fix the delineation by double clicking on the segment corresponding to the currently shown slice 110a. Double-clicking the respective segment 310 triggers an event which is intercepted by an event listener controlled by controller 160. Controller 160 then passes the event to an event handler. The event handler invokes a routine to query the associative array and sets as user requested the flag for the corresponding delineation 117a in slice 110a.

The user can then scroll as shown in FIG. 3b to slice 110b by moving slider 315 one segment up. The segment 310 associated with slice 110b is shown as hashured so the delineation 117b shown on the currently displayed slide 110b is protected. GUI 155 allows user to scroll through the slices 110a, b and toggle between protected and unprotected states by clicking the respective segment on slide bar 320 or by keystroke.

The delineation modifications include shifting, scaling, changing shape of the line or surface forming the delineation.

The delineations 117a-c are logically connected so that the 3D tool when applied to manipulate delineation 117a in slice 110a can automatically apply corresponding changes to other ones of the delineations 117b-c in other ones of the slices 110b-c. The collection of logically linked delineations 117a-c form the 3D delineation of the region of interest 120. For example, if user decides to apply 3D tool 130 to change shape of delineation 117a, the tool would then automatically apply similar modifications to neighboring slices 117b-c. By this automatic co-modification of not currently viewed delineations 117b-c the geometrical continuity of the region of interest 120 as defined by the collection of delineations 117a-c can so be ensured or enforced.

The system according to FIGS. 2 and 3 aids the radiologist navigate and modify/manipulate the sub-volume delineations 117a-c across the whole image set 100 because the action of the delineation tool 130 on delineations 117b,c in currently not viewed slices 110b,c is controllable. The delineation tool in not being given unchecked access to delineations 117a-c currently not viewed. When the user requests via the delineation tool 130 the modification of delineation 117a as displayed in window 305, the controller 160 registers the automatically issued co-modification requests and invokes modification tracker routine 145 shown in FIG. 2. Tracker 145 acts as a guard and intercepts all modification requests issued by 3D delineation tool 130. Based on the intercepted delineation (co-)modification requests the tracker establishes the identity of the delineations 117b-c that are to be co-modified as a result to the modification applied to the current delineation 117a. Tracker 145 then looks up in the associative array the flags of each of the delineations 117b-c that are about to be co-modified. Tracker 145 allows the modification only if the flag indicates an unprotected state. Otherwise, tracker 145 blocks the requested co-modification if the to be co-modified delineation 117b, c is in a protected state. Tracker 145 is also used when requesting modification of the currently viewed delineation 117a and queries the status of currently viewed delineation 117a before allowing the request.

The system according to FIGS. 2 and 3 allows the radiologist to define a collection among the automatically generated delineations 117a, b or c which he believes are worthy of preservation. He can then use the 3D delineation tool to modify the unprotected ones without having to worry about losing the information in the protected delineations.

According to one embodiment of the invention, the state, protected or unprotected, of the delineation 117a in the currently viewed slice 110a is color-coded by the frame 307 of the window 305 as shown in FIG. 3b or is further indicated or alternatively indicated by a colored disc 175 overlaid inside the window 305. Coloring of window frame 307 or disk 175 changes in response to status changes.

Figure 4A:
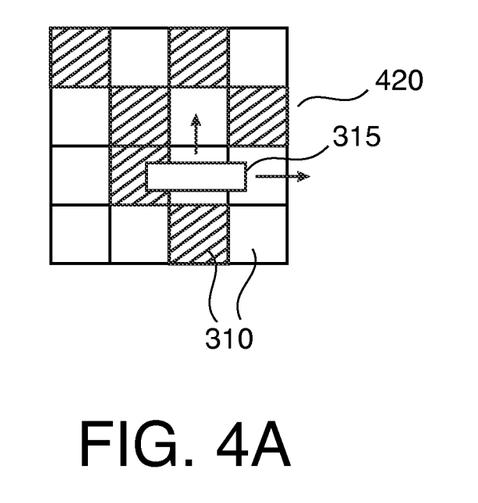
FIG. 4A to 4B show different embodiments of a slide bar as used in FIGS. 3A to 3B.
Figure 4B:
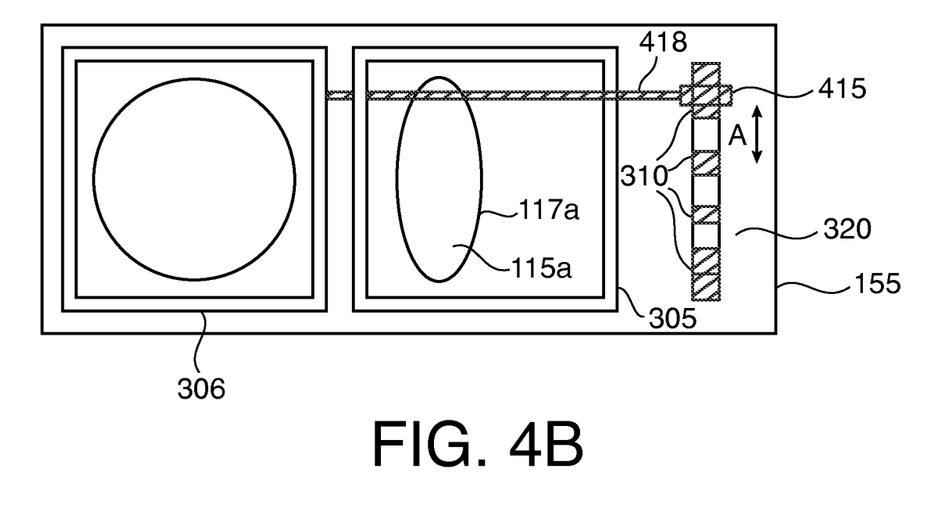

FIGS. 4A to 4B show different embodiments of the slide bar.

With reference to FIG. 4A, "2D" indicator 415 is suitable for higher dimensional data sets, such as 4D. The widget 420 allows the user to move slider 315 in two-dimensions across the "chess board" like pane tiled with the graphical elements/segments 310 each indicating the respective status of the slice it represents. Indicator 420 can be thought of as a "2D" slide bar in analogy to the slide bar 320 in FIGS. 3a-b.

With reference to FIG. 4B, slider 410 has a line 418 extending across an extra window widget 305 displaying a slice orthogonal to the slice displayed in a main window widget 306 and the line 418 is movable along with the slider 410. The exact position of displayed slice in the main window widget 306 in and across the 3D image data set 100 can be ascertained more easily by the radiologist by looking on the overview orthogonal slice in the window widget 305. The cross line 418 is color-coded to indicate the current status of the delineation 117a in the slice 110a currently displayed in the main window widget 306. The color of the line 418 changes in accordance with the status of the delineation in the slice currently viewed and the line 418 and slider 315 then show the same coloring.

Figure 5:
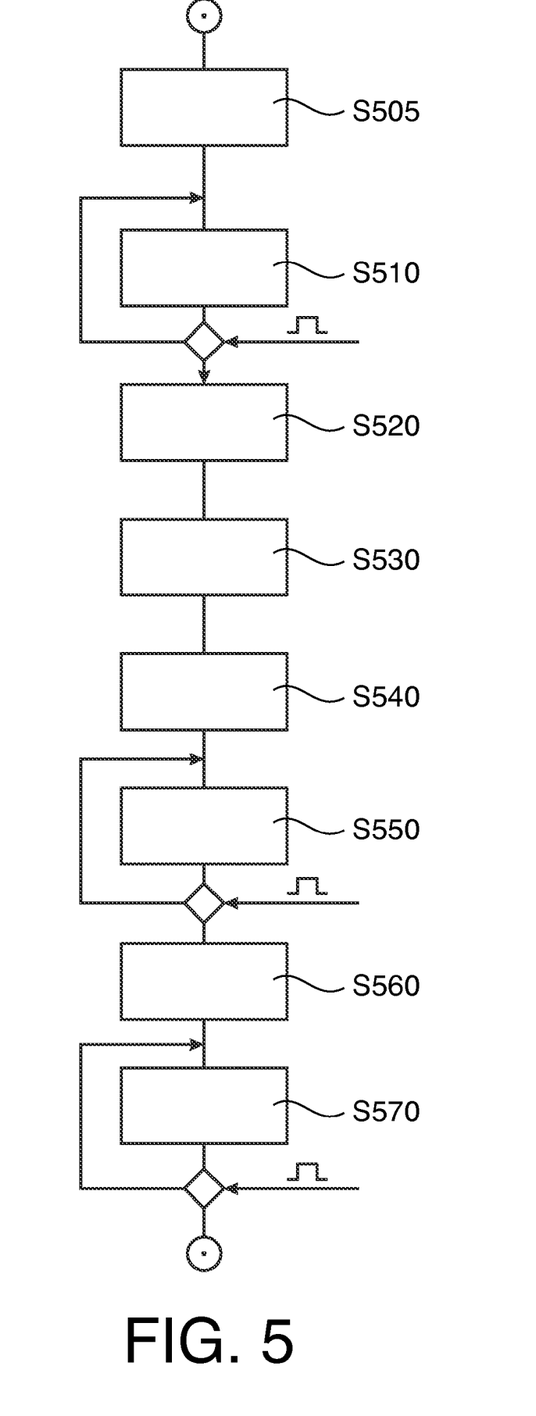
FIG. 5 shows a flow chart for a method according to one embodiment of the invention.

With reference to FIG. 5 shows a flow chart of a method of aiding navigation/modification of 3D image data sets.

In step 510 slices 110a-b are received. The slices have respective delineations 117a-c assigned, the delineations being in one of two states, a protected or unprotected state.

As an alternative, in an initialization step 505, delineations 117a-c are automatically generated with default states automatically assigned to each of the delineations or a sub-selection of the delineations.

In step S520, slice 110a having delineation 117a is displayed on a graphical user interface. Upon user request, another one of slices 110b-c may be displayed instead.

Concurrently with displaying of the slice 110a, in step S530 a visual indication of the spatial position of the slice in the 3D image data is displayed. In one embodiment, the positions of the slices in the 3D data set are displayed for all slices in the set whether or not currently viewed. Alternatively, a user selectable sub-selection of slices is definable. The positions of only the selected slices will then be displayed.

In step 540 a visual indication of the current status of slice 110a and of not currently viewed slices 110b-c is displayed with different states being represented by different visual indications. In one embodiment the states of all slices are displayed or the user may define a sub-selection of those slices for which a delineation status is to be displayed.

Upon user request, in step 550 a request is received to change the status of the delineation 117a in the first slice 110a or the second delineation 117b in the second slice 110b into the respective other state. In response to the request to change the status, the display of the visual indication of the status of the first slice or second slice is then updated in step S560.

In step 570 when a user request to modify delineation 117a in slice 110a is received, the modification request is intercepted along with one or more automatically generated co-modification request directed at one or more of the remaining delineations 117b-c in slices 110b-c.

In a further step, for each delineation for which a modification or a co-modification request has been received, the status is checked. If the status is found to be unprotected, the modification or co-modification request for that particular slice is allowed. Otherwise if the state is found to be a protected one, the modification or co-modification request is blocked and not allowed.

The above sequence of steps is exemplary only, and the steps may be executed in any order once states and positions are displayed. The displaying steps may be executed concurrently.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for aiding in navigating or modifying an at least 3D image data set, the set including a plurality of cross sectional 2D image slices, including first and second slices, the slices representing a cross sectional view on the 3D image data set, each of the two slices having one of a plurality of states, the apparatus comprising:
   a database interface to access the 3D image data set and the slices therein;
   a graphical user interface controller configured to display on a screen a graphical user interface (GUI), the graphical user interface (GUI), when so controlled and displayed on the screen, comprising:
   a selection widget to select for display as an image a first slice of the 3D image data;
   a window widget for displaying the first slice as an image;
   a slice position indicator widget for i) displaying a visual indication of the spatial position of the first slice in the 3D image data set, and ii) for displaying a visual indication of the spatial position of the second slice in the 3D image data set and for indicating the relative positions between the first and second slices in the 3D image data set;
   a graphical element for displaying a visual indication of a current status of the first slice and of a current status of the second slice, different states being represented by different visual indications;
   the graphical user interface controller further configured to i) receive a user request to change the current status of the first or the second slice into a new status from among the plurality of states and, when the user request to change the current status has been received, to ii) update the displaying of the visual indication of the status of the first or second slice to now represent the requested new status of the first or second slice, wherein each of the slices has one of two states, either a protected or an unprotected states, wherein, each of the two slices includes a sub-volume delineation each representing a different cross section of a 3D or higher dimensional delineation of a region of interest in the at least 3D image data set, the 3D delineation extending across at least the two slices, the 3D delineations being a result of an application to the first slice of a 3D delineation tool, the delineations of the slices being logically linked so that a later modification by the same or another 3D delineation tool of the delineation in the first slice automatically effects a corresponding co-modification of the delineation in the second slice when the second slice is in the unprotected state, whereas, when the second slice is in the protected state, the co-modification is blocked.

2. The apparatus of claim 1, wherein the slice position indicator is a slide bar comprising a graphical slider and a graphical bar, the slider capable of sliding along the bar upon user interaction by a pointer device, the bar comprising a series of segments as the graphical elements, each segment associated with one of the slices including first and second slices, different segments indicating different slices, and contiguous segments indicating a contiguous spatial relationship in the 3D data set of the respective slices.

3. The apparatus of claim 1, wherein the displaying of the visual indication of the states of any slice including the first and second slice is by color-coding the bar segments, each color indicating a different state and wherein the slider changes its color when sliding over the bar, the slider when positioned over any one of the segments echoing the color of that segment.

4. The apparatus of claim 1, wherein the graphical element is a frame of the window widget, the visual indication of the status of the first or second slice is by color-coding the frame, one color at time for the slice currently displayed in the window widget, or the graphical element is a color-coded disk overlaid on and inside the window widget.

5. The apparatus of claim 1, wherein the status change or the changeover from displaying the first instead of the second slice is effected by the controller intercepting a mouse click event or a key stroke event, consecutive events causing toggling between two of the states if there are exactly two states for each slice or the consecutive events causing periodic cycling through the states if there are more than two states for each slice.

6. The apparatus of claim 1, the graphical user interface controller further configured to receive a user request to display the second slice in the window widget instead of or along with the first slice, the request being effected by user interaction with the slice position indicator or by keystroke.

7. The apparatus of claim 2, wherein the slider comprises a cross line, the line sweeping across the first window and over the slice displayed therein when the user requests moving of the slider.

8. A screen on which a graphical user interface GUI is displayed and wherein the graphical user interface GUI is controlled by the graphical user interface controller comprised in the apparatus according to claim 1.

9. A medical image post processing system for aiding in navigating or modifying an at least 3D image data set, the set including a plurality of cross sectional 2D image slices including first and second slices, each of the two slices having one of a plurality of states, the system comprising:
   an apparatus according to claim 1;
   computer unit for running the apparatus;
   a database holding the 3D image set;
   a screen for displaying the slices as images;
   a 3D delineation tool for modifying delineations in the slices; and
   a keyboard or a pointer device for user input.

10. A method of aiding in navigating or modifying an at least 3D image data set, the set including a plurality of cross sectional 2D image slices including first and second slices, each of the two slices having one of a plurality of states, the method comprising:

displaying the first slice as an image in a graphical user interface on a screen;

along with displaying the first slice, displaying in the GUI a visual indication of the spatial position of the first slice in the 3D image data set, the first slice representing a view on the 3D image date set;

displaying in the GUI a visual indication of the spatial position of the second slice in the 3D image data set;

displaying a visual indication of a current status of the first slice and of a current status of the second slice, different states being represented by different visual indications;

upon user interaction, receiving a request to change the current status of the first or the second slice into a new status from among the plurality of states;

when a user request to change the current status has been received, updating the displaying of the visual indication of the status of the first or second slice to now represent the requested new status of the first or second slice, wherein each of the slices has one of two states, either protected or an unprotected state, each of the two slices includes a sub-volume delineation each representing a different cross section of a 3D or higher dimensional delineation of a region of interest in the 3D image data set, the 3D delineation extending across at least the two slices, the 3D delineation being a result of an application to the first slice of a 3D delineation tool, the slices being logically linked so that a later modification by a delineation tool of the sub-volume delineation in the first slice automatically effects a corresponding co-modification of the delineation in the second slice when the second slice is in the unprotected state, whereas, when the second slice is in the protected state, the co-modification is blocked.

11. The method of claim 10, further comprising:

receiving a user request to display the second slice in the window widget, and when such a request is received, updating the first window to display the second slice instead of or along with the first slice.

12. A computer program element for controlling an apparatus according to claim 1.

13. A computer readable medium having stored thereon the program element of claim 12.

\* \* \* \* \*